(12) United States Patent
Zimmer et al.

(10) Patent No.: US 6,463,621 B1
(45) Date of Patent: Oct. 15, 2002

(54) WINDSCREEN WIPER WITH SPRAY NOZZLE

(75) Inventors: Joachim Zimmer, Sasbach (DE); Norbert Wegner, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,091

(22) PCT Filed: Feb. 4, 2000

(86) PCT No.: PCT/DE00/00356

§ 371 (c)(1),
(2), (4) Date: Nov. 13, 2000

(87) PCT Pub. No.: WO00/48878

PCT Pub. Date: Aug. 24, 2000

(30) Foreign Application Priority Data

Feb. 15, 1999 (DE) .......................... 199 06 197

(51) Int. Cl.[7] .............. B60S 1/52; B05B 1/30
(52) U.S. Cl. .............. 15/250.04; 15/250.05; 239/132; 239/133; 239/284.1; 239/533.13; 239/541
(58) Field of Search .............. 15/250.04, 250.01, 15/250.02, 250.05; 239/571, 533.13, 533.15, 284.1, 284.2, 570, 133, 132

(56) References Cited

U.S. PATENT DOCUMENTS

| 3,298,391 | A | * | 1/1967 | Savage ................. 239/533.15 |
| 3,445,085 | A | * | 5/1969 | Eckel et al. ........... 239/533.15 |
| 5,433,382 | A | | 7/1995 | Baumgarten ............ 239/284.1 |
| 5,524,829 | A | * | 6/1996 | Keim et al. ................. 239/570 |

FOREIGN PATENT DOCUMENTS

| DE | 37 44 237 A1 | 7/1989 |
| DE | 198 15 171 A1 | 6/1999 |
| EP | 0 667 267 A | 8/1995 |
| GB | 795 483 A | 5/1958 |
| GB | 2 223 424 A | 4/1990 |

* cited by examiner

Primary Examiner—Gary K. Graham
(74) Attorney, Agent, or Firm—Michael J. Striker

(57) ABSTRACT

The invention relates to a windshield wiper having arm (10), which is driven via a drive shaft and on which a wiper blade is (20) is pivotably connected. At least one spray nozzle (64) for providing fluid to the windshield is disposed on one of the pivotable parts (10,22) and is connected via a water inlet (56) to a water pump. A nozzle body (40) with one inlet conduit (42) and at least one outlet conduit (44) is provided in a housing (36). A spray nozzle is mounted in the nozzle body. Both inlet and outlet conduits have openings on a jacket face of the nozzle body. A diaphragm (58,70), in a pressureless state, closes the inlet conduit (42) and the outlet conduit (44) on the jacket face.

10 Claims, 3 Drawing Sheets

WINDSCREEN WIPER WITH SPRAY NOZZLE

BACKGROUND OF THE INVENTION

The invention is based on a wiper arm. Known windshield wipers have a wiper arm, which is made up of a fastening element and a hinge element, which is pivotably connected to it via a swivel joint and has a wiper rod. A hooklike end of the wiper rod engages a suspension box of a wiper blade, which is formed by two side cheeks of a middle bracket and includes a hinge bolt. The hinge thus formed guides the wiper blade over the vehicle window during the swiveling motion. The wiper blade has what is as a rule a multi-member support bracket system, with subordinate brackets pivotably connected to the middle bracket, at least some of which subordinate brackets, with claws on their ends, retain a wiper strip by its head strip. The multi-member support bracket system and spring rails placed in the head strip make it possible during wiping for the wiper strip to adapt, with a uniform contact pressure, to a curved windshield. To that end, a tension spring prestresses the swivel joint. The wiper arm is secured with its fastening element on a drive shaft and is driven by it in the wiping motion.

Such windshield wipers are known, for instance from German Patent Disclosure DE 37 44 237 A1. In simple versions, subordinate brackets, also known as intermediate brackets and claw brackets, can be dispensed with. In the simplest case, the middle bracket itself has claws, with which it retains the wiper strip.

Windshield washing systems for vehicles are as a rule used in conjunction with windshield wipers. They are actuated if the moisture from precipitation does not suffice to clean the vehicle window. They include a water container, spray nozzles, and a pump which pumps water, sometimes admixed with cleaning and antifreeze agents, under pressure out of the water container to the spray nozzles. As a rule, the spray nozzles are secured to some part of a vehicle body, such as a hood, window frame, or the like. To prevent the spray nozzles from freezing at temperatures below the freezing point, heating elements are integrated into the spray nozzles and communicate with a power supply via plugs located on the outside. The heating elements require relatively great effort and expense for producing the spray nozzles and great effort and expense for assembly for laying the electric lines and contacting the plugs.

It is already known for spray nozzles to be secured as additional components to the wiper blade and thus for the spray water to be distributed over the wiping region directly with a short length of stream. Since the spray water is concentrated on a region in the vicinity of the wiper blade and is washed off again within the shortest possible time by the wiping motion, the view is hindered only briefly by the spray water applied. One disadvantage of such systems is that the effects of weather, especially hail and strong sunshine, greatly affect the flexible parts of this arrangement, which are needed for spanning the hinged regions between the wiper arm and the wiper blade. Furthermore, the spray nozzles and water lines, which are exposed to the relative wind, rapidly freeze closed at temperatures below the freezing points, unless antifreeze is admixed with the water. Frozen water lines and spray nozzles can be defrosted again as a rule only with great effort.

In an earlier German Patent Application, DE 198 15 171.3, a wiper arm is described on the hinge part of which, or a wiper rod integrally connected to the hinge part, spray nozzles are disposed. The spray nozzles are located in a nozzle body, which is accommodated in a bulge of the hinge part that has an injection opening for the spray stream, or is clipped, protruding downward, in a lateral mount on the wiper rod. It is also possible for two nozzle bodies to be provided, which are joined to one another by means of a rigid or flexible connecting piece. The nozzle bodies are easily replaced and are well protected from environmental factors.

Expediently, the spray nozzle has a check valve opening outward, which prevents the water line, if the washing system has not been used for a long time, from running empty and prevents water from escaping if the wipers are operated without the washing function, especially at high wiping frequencies and/or in the case of stroke-controlled wiper arms. There is also the risk that windshield washer fluid will evaporate in the region of the spray nozzle, especially if the spray nozzle is heated, and the spray nozzle will become constricted or plugged by deposits.

A heating device, passed in the form of a wire through a water supply line and embodied as a heating coil in the nozzle body, is integrated into windshield wiper system. The heating device fits only one type of windshield wipers, so that a large number of different heating devices have to be kept on hand. Furthermore, simple solutions are obtained by providing that the nozzle bodies are integrally joined together and are produced from plastic as an injection-molded part. By means of the nozzle bodies distributed along the wiper arm, the spray water is well distributed over the wiping region, especially if a spray stream is directed into a lower region directly in front of the wiper blade. Since this arrangement results in short stream lengths, the relative wind can have only little effect on spray water distribution, even at a relatively high vehicle speed.

SUMMARY OF THE INVENTION

According to the invention, a nozzle body with one inlet conduit and at least one outlet conduit is let into a housing. The inlet conduit originates on a face end pointing toward the water inlet and discharges at a jacket face of the nozzle body, while the outlet conduit originates at the jacket face spaced apart from the inlet conduit and discharges into a spray conduit leading to the spray nozzle. A diaphragm in the pressureless state closes the inlet conduit and the outlet conduit. The outlet conduit can be located close to the spray nozzle, so that only a small volume of water is stored between the diaphragm and the spray nozzle and hence can flow or evaporate uncontrollably.

The diaphragm is embodied as an annular spring diaphragm or advantageously, in a simple way, as a rubber-elastic tubular diaphragm, which has beads on its ends. These beads are embedded in annular grooves of the nozzle body. When water flows in on the inlet side, the diaphragm is widened, opens the inlet conduit and the outlet conduit, and is braced on the outside of the housing.

In order that only the ambient pressure and the prestressing of the diaphragm have to be overcome for the sake of opening, there is a venting bore on the nozzle housing. The opening pressure of the diaphragm is slight, and so the system can be operated with a relatively small pumping capacity.

The nozzle body can easily be produced from plastic by injection molding. Its outside diameter decreases between the annular grooves on both ends, so that the tubular diaphragm is retained sealingly on its ends between the housing and the nozzle body, but in the region of the inlet conduit and the outlet conduit has sufficient radial play to open up sufficiently large flow cross sections. The smooth, cylindrical outer contour is thus preserved. To enable aiming the spray nozzle, this nozzle has a spherical outer contour, with which it is pressed into a ball seat of the nozzle body. This embodiment of the nozzle body offers the advantage of a compact design and thus lower costs.

To make the spray nozzle and the valve usable for winter operation as well, they are heated. The heating line advantageously leads through the water inlet and through a bore of the nozzle body as far as the vicinity of the spray nozzle. The heating line is soldered, glued or clamped into the nozzle body. The diaphragm closes off the water chamber from the outside and thus prevents the heated water from evaporating and calcifying the spray nozzles.

With the aid of the diaphragm, the water is trapped in the system during nonusage periods. Thus the windshield washer fluid can be sprayed in front of the wiper blade at the correct moment, in clocked spraying. In order not to hinder the view of the driver, the water sprays during the upward motion of the wiper arms, but in downward wiping no water is allowed to dribble after it.

A smaller structural volume of the entire valve is obtained by providing that the water and energy supplies are integrated in one element, and electrical contacting of the heating and the nozzle are omitted.

In this valve, good energy transmission is achieved because there is only a slight distance between the water conduit and the spray nozzle, or the spray nozzle is disposed in the conduit. When the nozzle body is made of plastic, thermal insulation from the outside is obtained, so that the heat dissipation is concentrated in particular on the spray nozzle and the water. This leads to lower energy consumption.

The heated water improves the cleaning action, so that the water consumption and especially the consumption of environmentally harmful additives can be reduced. The cleaning action can also be improved by a plurality of spray nozzles that are disposed on the wiper arm, spaced apart by several centimeters from one another.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will also expediently consider the characteristics individually and combine them into suitable further combinations.

Shown are.

DESCRIPTION OF THE PREFERRED EMBODIMENTS

Figure 1:
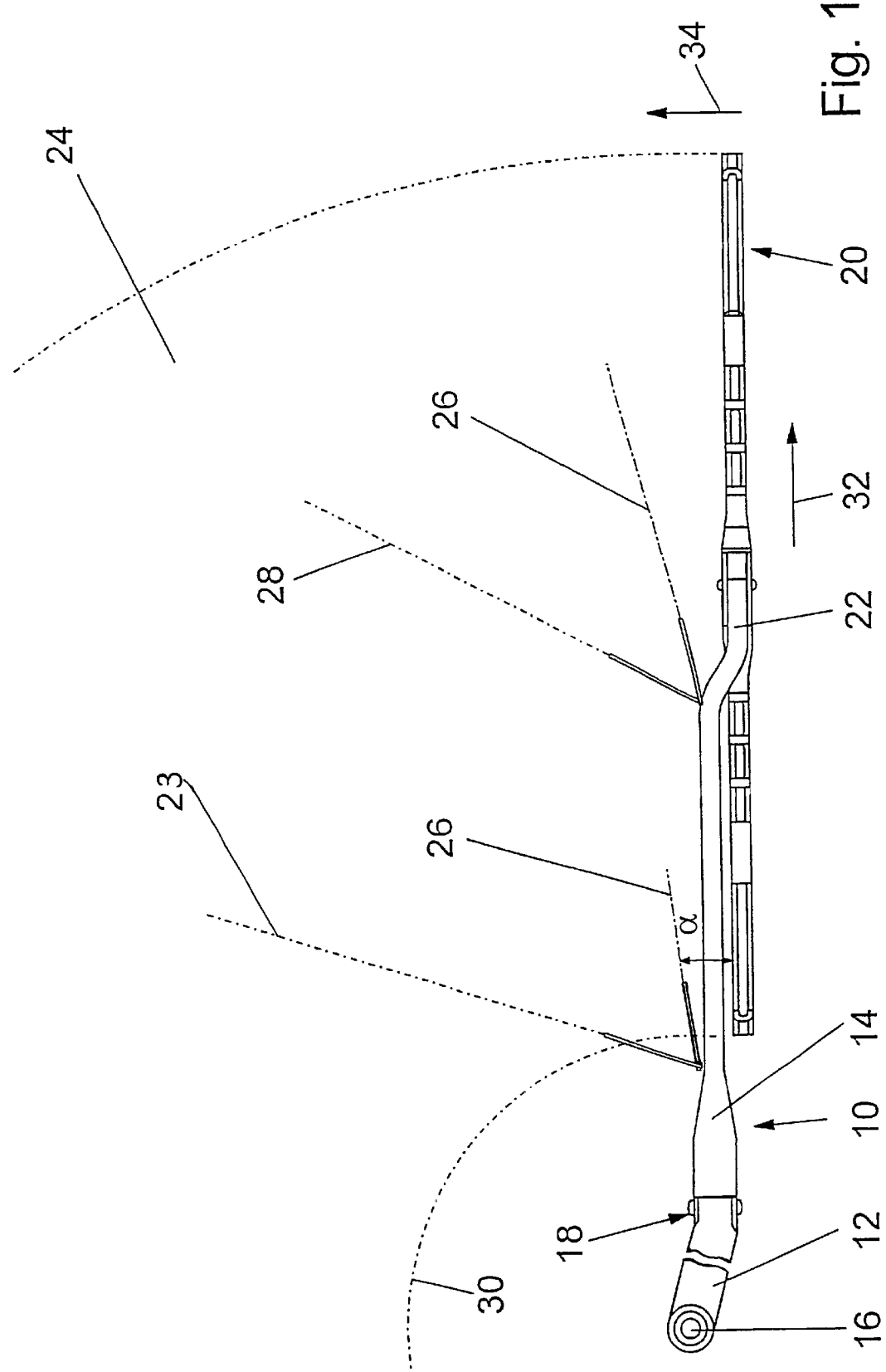
FIG. 1, a perspective view of a windshield wiper according to the invention.

The windshield wiper of FIG. 1 has a wiper arm 10, which is made up of a fastening element 12 and a hinge element 14 with a wiper rod 22. The fastening element 12 has a receiving bore 16, with which it is secured to a drive shaft, not shown. The hinge element 14 is pivotably connected to the fastening element 12 via an abc 18 and prestressed via a spring mechanism, not identified by reference numeral or described further here. The spring mechanism on the one hand presses the wiper blade 20, via the wiper arm 10, against a vehicle window and on the other keeps the hinge element 14 with the wiper rod 22 in a position pivoted out of the way, to make it possible to clean or change the wiper blade 20.

The hinge element 14 and the formed-on wiper rod 22 have an open U-shaped profile, into which a housing 36 with a built-in nozzle body 40 and a spray nozzle 64 is inserted from below. A plurality of spray nozzles 64 are mounted, spaced apart from one another, on the wiper arm 10. Such an arrangement makes it possible during the upward motion of the wiper arm 10 to distribute windshield washer fluid in the starting direction 34 in front of the wiper blade 22 over the region of the wiping field 24. The water can emerge in the form of two spray streams 26 or 28. The spray stream 26 is aimed such that it forms a small angle $\alpha$ with the wiper blade 20, while the spray stream 28 supplies the region that is located farther in front of the wiper blade 26 in the starting direction 34.

Figure 2:
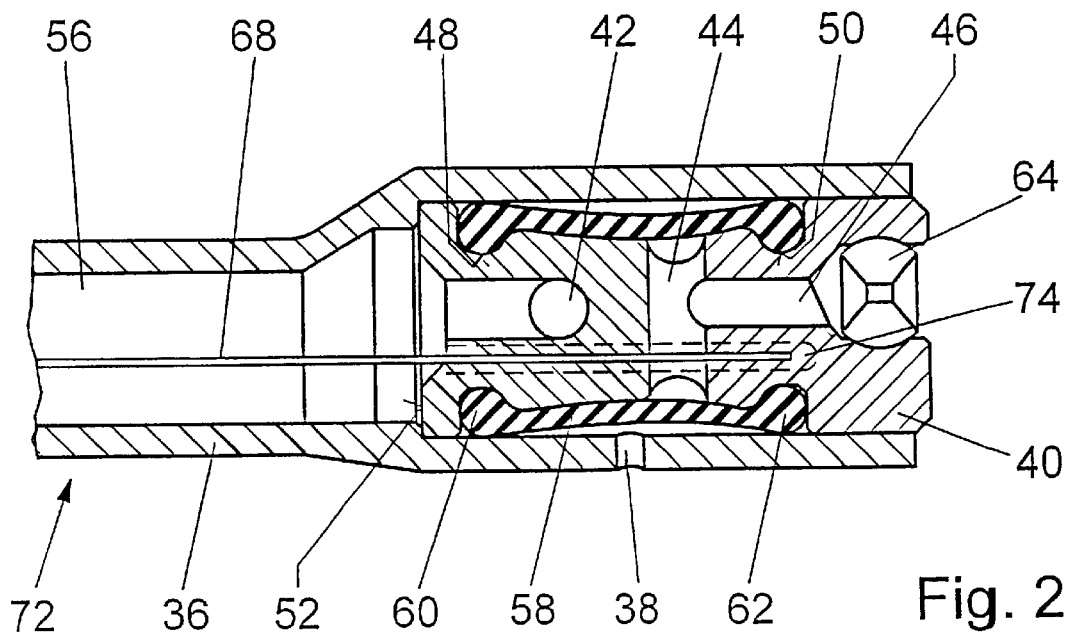
FIG. 2, a fragmentary longitudinal section through a valve with a spray nozzle in the closed state.
Figure 3:
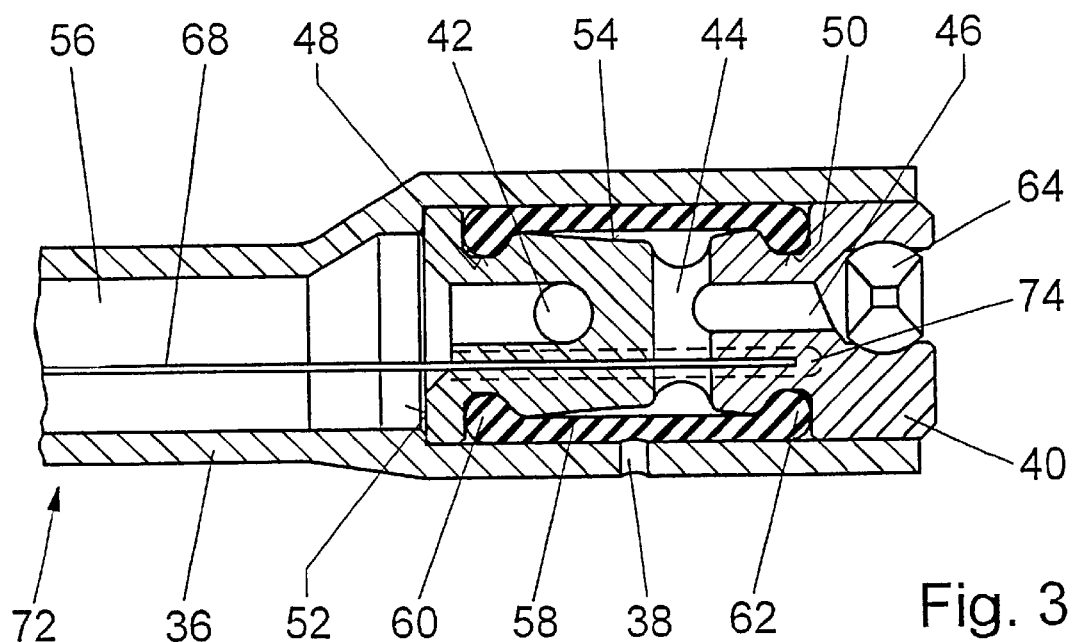
FIG. 3, a fragmentary longitudinal section through a valve with a spray nozzle in the opened state.

FIG. 2 shows the valve 72 in the closed state and FIG. 3 shows the open state. By exertion of a pump pressure, water flows from a water inlet 56 through the inlet conduit 42 and widens a tubular diaphragm 58, so that the water, via the outlet conduit 44, reaches a spray conduit 46 and finally reaches the outside through a spray nozzle 64. The inlet conduit 42 originates at a face end 52, pointing toward the water inlet 56, and discharges at a jacket face 54 of the nozzle body 40, while the outlet conduit 44 originates at the jacket face 54 at a distance from the inlet conduit 42 and discharges into a spray conduit 46 leading to a spray nozzle 64.

Figure 4:
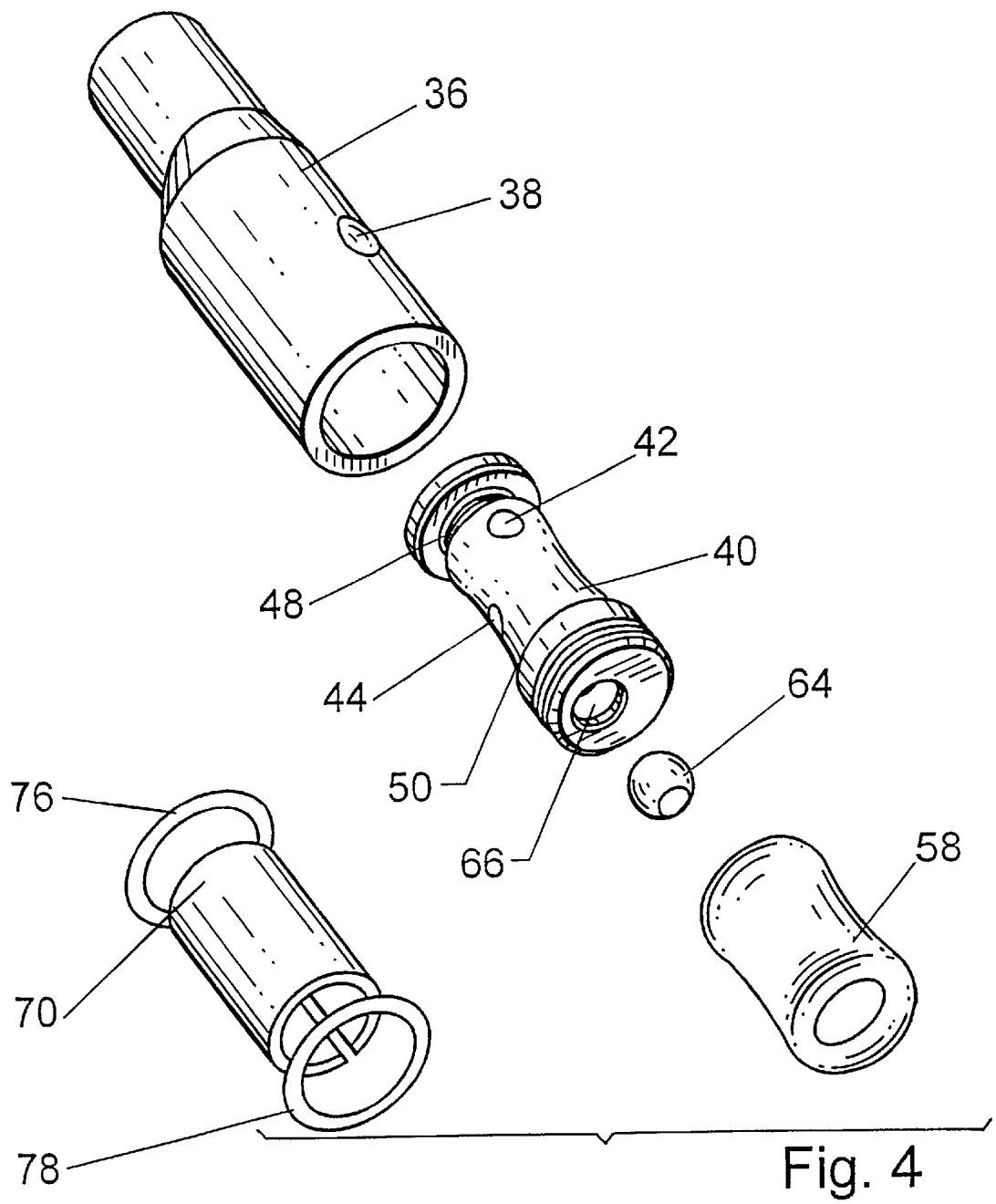
FIG. 4, an exploded view of a valve with a nozzle and two versions of diaphragm.

When water emerges in the open state of the valve 72, the tubular diaphragm 58 is braced on the housing 36, which on its circumference has at least one venting bore 38. In the closed state of the valve 72, the tubular diaphragm 58 rests under its own tension on the nozzle body 40. It closes the inlet conduit 42 and the outlet conduit 44 and thus disconnects them from one another. The tubular diaphragm 58 comprises an elastomer and has beads 60 and 62 on its ends that are embedded in the annular grooves 48 and 50 of the nozzle body 40 and seal off the nozzle body 40 on its ends, on the circumference, from the housing 36. Additional sealing means can thus be dispensed with. Instead of the tubular diaphragm 58, a slit annular spring diaphragm 70 can also be disposed (FIG. 4) between two sealing rings 76, 78. In order for it to securely close the inlet conduit 42 and the outlet conduit 44, the annular spring diaphragm 70 is expediently fixed against rotation.

The nozzle body 40, which is expediently embodied in one piece, is made of plastic as an injection-molded part. As a result, the water in the nozzle body 40 is thermally insulated, so that even at low temperatures, only little heating capacity is necessary. In the injection molding process, not described in further detail here, a ball seat 66 is injected with subsequent forced unmolding and then receives a spray nozzle 64. The outside diameter of the nozzle body 40 decreases toward the annular grooves 48 and 50, so that between it and the housing 36, there is play for the motion of the tubular diaphragm 58.

A spray nozzle 64 is held with a ball seat 66 in the nozzle body 40 and comprises a material with good thermal conduction, such as metal, which makes a good heat transfer from the water to the spray nozzle 64 possible.

A heating line 68 (FIGS. 2, 3) leads through the water inlet 56 to a bore 74 of the nozzle body 40. The bore 74 extends into the vicinity of the spray nozzle 64. The heating line 68 is soldered, glued or clamped into the bore 74. Such internally located heating and a favorable choice of the materials employed for the components used result in a small structural volume and economies in terms of energy and expense.

What is claimed is:

1. A windshield wiper having a wiper arm (10), which is driven via a drive shaft and on which a wiper blade (20) is pivotably connected, and at least one spray nozzle (64) is disposed on a pivotable part (10, 22) that is connected via a water inlet (56) to a water pump, characterized in that a nozzle body (40) with one inlet conduit (42) and at least one outlet conduit (44) is provided in a housing (36), and the inlet conduit (42) originates on a face end (52) pointing toward the water inlet (56) and discharges at a jacket face (54) of the nozzle body (40), while the outlet conduit (44) originates at the jacket face (54) spaced apart from the inlet conduit (42) and discharges into a spray conduit (46) leading to the spray nozzle (64) which is mounted in said nozzle body (40), and a diaphragm (58, 70) in the pressureless state closes the inlet conduit (42) and the outlet conduit (44).

2. The windshield wiper of claim 1, characterized in that the diaphragm is a rubber-elastic tubular diaphragm (58).

3. The windshield wiper of claim 2, characterized in that the tubular diaphragm (58), on its ends, has beads (60, 62) that are embedded in annular grooves (48, 50) of the nozzle body.

4. The windshield wiper of claim 2, characterized in that a venting bore (38) is provided on the circumference of the tubular diaphragm (58) in the housing (36).

5. The windshield wiper of claim 2, characterized in that the tubular diaphragm (58) is braced on a wall of the housing (36) after a predetermined opening stroke.

6. The windshield wiper of claim 2, characterized in that an outside diameter of the nozzle body (40) decreases in a region between ends of the tubular diaphragm (58).

7. The windshield wiper of claim 1, characterized in that the spray nozzle (64) is retained in the nozzle body (40) by a ball seat (66).

8. The windshield wiper of claim 7, characterized in that the nozzle body (40) of plastic is produced by injection molding, and the ball seat (66) is injected into it.

9. The windshield wiper of claim 1 characterized in that a heating line (68) is extended through the water inlet (56) and through a bore (74) of the nozzle body (40) into a vicinity of the spray nozzle (64) and is secured in the bore (74).

10. The windshield wiper of claim 9, characterized in that the heating line (68) is a selected one of soldered, glued or clamped into the nozzle body (40).

* * * * *